Sept. 14, 1937.  H. BARTELS  2,092,868
RECORDING OF SOUND
Filed June 25, 1935
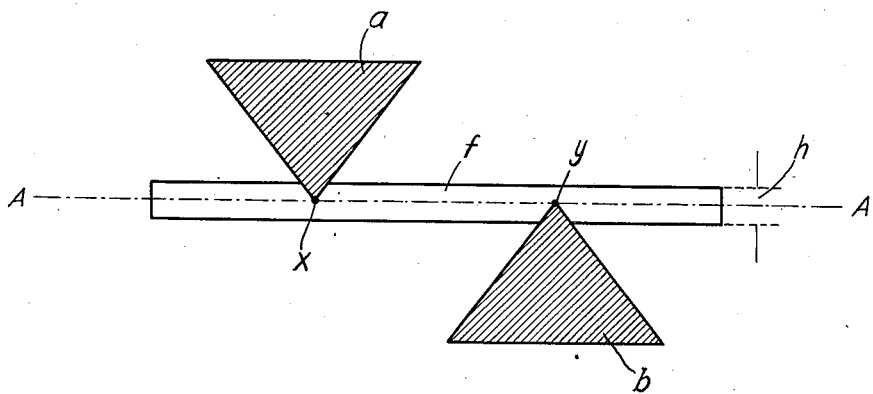
INVENTOR
HANS BARTELS
BY
ATTORNEY Patented Sept. 14, 1937

2,092,868

UNITED STATES PATENT OFFICE 2,092,868

RECORDING OF SOUND

Hans Bartels, Berlin-Spandau, Germany, assignor to Klangfilm G. m. b. H., Berlin, Germany, a corporation of Germany Application June 25, 1935, Serial No. 28,379
In Germany August 20, 1934

2 Claims. (Cl. 179—100.3)

This invention relates to the recording of sound and has for its principal object the provision of an improved apparatus and method of operation whereby distortion of the recorded sound is minimized or avoided.

It is known that single-peak or multi-peak sound tracks may be recorded by the push-pull method so that the positive and the negative alternations or half-cycles of the sound to be reproduced at a later date are recorded in distinct tracks. For this purpose, recourse has been had to diaphragms or light stops provided with triangular openings which pass triangularly shaped beams of light rays issued from the sound recorder lamp. These light beams and thus the images of the triangular apertures in the diaphragm or diaphragms are moved at right angles to the longitudinal direction of a slit which, as known from the prior art, is mounted in front of the film strip or which is imaged upon the film strip. The position of the triangular diaphragms and the direction of vibration of the mirror in this scheme is so chosen that in the presence of a positive alternation of the oscillations to be recorded, light passes through one of the diaphragms and the slit to the record strip, while the other one of the diaphragms shuts off the light, whereas for the negative half, the two diaphragms exchange their roles.

The disposition of the diaphragms in reference to the slit has heretofore been chosen in such a way that for zero sound volume, neither diaphragm (or shutter) will allow light to fall across the slit upon the film strip.

In accordance with this invention the diaphragms are mounted in such a fashion that for zero sound volume the peaks or apices of the said triangular shutters are positioned exactly in the middle of the slit. Experience has shown that for such a position of the triangles $a$ and $b$ in relation to slit $f$ the oscillations to be recorded are recordable in perfect absence of distortions, whereas in the previous disposition of the triangles in reference to the slit $f$ certain distortions in the recording were inevitable, and this naturally impairs the faithful rendition of the record.

The single figure of the drawing diagrammatically illustrates an arrangement in accordance with the invention.

Referring to the drawing, $f$ denotes a slit whose height (width) is indicated by $h$. The position of the two light-ray pencils $a$ and $b$ falling into the plane of the slit $f$ in stationary position of the mirror, is indicated by the shading. The apices $x$ and $y$ of the triangles, i. e., the bottom point of the triangle $a$ and the peak of the triangle $b$, according to this invention, are positioned along the center line A—A of the slit $f$.

Included inside the scope of this invention would also be a sound recorder device in which the path of the rays is not by way of a mirror, but in which the recording lamp or luminous source, the requisite lenses, and the slit are positioned along a straight line, and in which the triangular diaphragms are moved at right angles to the longitudinal direction of the slit in accordance with the sounds to be recorded.

Having now described my invention, I claim:

1. The combination of means for producing a pair of triangularly shaped light beams, a light slit, and means for projecting said beams on opposite sides of said slit with their apices positioned at the medium line of said slit.

2. The combination of means for producing a pair of triangularly shaped light beams, a light slit, means for projecting said beams on opposite sides of said slit with their apices positioned at the medium line of said slit, and means operable in response to sound for moving said beams transversely of said slit.

HANS BARTELS.